(12) United States Patent
Hikida

(10) Patent No.: US 9,245,197 B2
(45) Date of Patent: Jan. 26, 2016

(54) IMAGE PROCESSING APPARATUS, IMAGE PROCESSING METHOD, AND COMPUTER-READABLE RECORDING MEDIUM

(71) Applicant: Satoshi Hikida, Kanagawa (JP)

(72) Inventor: Satoshi Hikida, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/383,727

(22) PCT Filed: Mar. 11, 2013

(86) PCT No.: PCT/JP2013/057332
§ 371 (c)(1),
(2) Date: Sep. 8, 2014

(87) PCT Pub. No.: WO2013/141144
PCT Pub. Date: Sep. 26, 2013

(65) Prior Publication Data
US 2015/0049954 A1 Feb. 19, 2015

(30) Foreign Application Priority Data
Mar. 19, 2012 (JP) .................................. 2012-062103

(51) Int. Cl.
*G06K 9/34* (2006.01)
*G06K 9/46* (2006.01)
(Continued)

(52) U.S. Cl.
CPC .............. *G06K 9/46* (2013.01); *G06T 7/0081* (2013.01); *G06T 11/60* (2013.01); *G06T 11/80* (2013.01);
(Continued)

(58) Field of Classification Search
USPC ............. 382/199, 190, 173, 103, 291, 294; 348/135, 155; 375/240.11
See application file for complete search history.

(56) References Cited

U.S. PATENT DOCUMENTS 7,929,730 B2 * 4/2011 Huang et al. .................. 382/103
8,571,316 B2 10/2013 Suzuki .......................... 382/173
(Continued)

FOREIGN PATENT DOCUMENTS

EP 2 328 127 A1 6/2011
JP 06-168288 A 6/1994
(Continued)

OTHER PUBLICATIONS

Extended European Search Report issued Mar. 2, 2015 in Patent Application No. 13763773.2.
(Continued)

*Primary Examiner* — Anh Do
(74) *Attorney, Agent, or Firm* — Oblon, McClelland, Maier & Neustadt, L.L.P.

(57) ABSTRACT

An image processing apparatus is disclosed, including a modification part, a model creation part, and a division part. The modification part instructs modification of a portion of a foreground area or a background area which is erroneously divided as a result of dividing predetermined image data into the foreground area being an extraction target and the background area being an out-of-extraction target. The model creation part creates a foreground model of the foreground area and a background model of the background area which are modified, based on first pixel values of a predetermined line segment where the modification is instructed and second pixel values of the foreground area and the background area which are divided. The division part divides the image data into the foreground area and the background area by using the foreground model and the background model which are created by the model creation part.

11 Claims, 13 Drawing Sheets

(51) Int. Cl.
  *G06T 7/00* (2006.01)
  *G06T 11/80* (2006.01)
  *G06T 11/60* (2006.01)

(52) U.S. Cl.
  CPC ............... *G06K 2009/4666* (2013.01); *G06T 2207/10024* (2013.01); *G06T 2207/20072* (2013.01); *G06T 2207/20076* (2013.01); *G06T 2207/20101* (2013.01); *G06T 2207/20144* (2013.01); *G06T 2207/20152* (2013.01); *G06T 2207/30128* (2013.01)

(56) References Cited

U.S. PATENT DOCUMENTS

| | | | | |
|---|---|---|---|---|
| 8,594,428 | B2 | 11/2013 | Aharoni et al. | 382/180 |
| 8,773,729 | B2 | 7/2014 | Suzuki | 358/468 |
| 2009/0304280 | A1 | 12/2009 | Aharoni et al. | 382/180 |
| 2011/0164814 | A1 | 7/2011 | Onai et al. | 382/164 |
| 2011/0216976 | A1 | 9/2011 | Rother et al. | 382/173 |
| 2012/0206490 | A1 | 8/2012 | Hikida | 345/660 |
| 2013/0063468 | A1 | 3/2013 | Hikida | 345/589 |
| 2013/0070304 | A1 | 3/2013 | Suzuki | 358/3.27 |

FOREIGN PATENT DOCUMENTS

| | | | |
|---|---|---|---|
| JP | H06-237372 | 8/1994 | |
| JP | H11-306374 | 11/1999 | |
| JP | 2000-306104 A | 11/2000 | |
| JP | 2009-545052 | 12/2009 | |
| JP | 2012208913 | * 10/2012 | ............ G06T 7/00 |
| KR | 10-2002-0021795 | 3/2002 | |
| WO | WO 2008/012808 A2 | 1/2008 | |
| WO | WO 2008/012808 A3 | 1/2008 | |

OTHER PUBLICATIONS

Yin Li, et al., "Lazy Snapping" ACM Transactions on Graphics, vol. 23, No. 3, XP009099127, Aug. 2004, pp. 303-308.

International Search Report Issued on Apr. 16, 2013 in PCT/JP2013/057332 Filed Mar. 11, 2013.

Oriya Yabuta et al., Adobe Photoshop CS5 Perfect Master, Shuwa System Co., Ltd., Aug. 8, 2010, pp. 389,394.

C. Rother, V. Kolmogorv, A. Blake, "Interactive Foreground Extraction Using Iterated Graph Cuts", GrabCut, ACM Transactions on Graphics (SIGGRAPH'04), vol. 23, No. 3, pp. 309-314, 2004.

Vincent, Luc, and Pierre Soille, "Watersheds in Digital Spaces: An Efficient Algorithm Based on Immersion Simulations", IEEE Transactions of Pattern Analysis and Machine Intelligence, vol. 13, No. 6, pp. 583-598, Jun. 1991.

Office Action issued Sep. 15, 2015 in Korean Patent Application No. 10-2014-7025949 filed Sep. 17, 2014 (with English Translation).

* cited by examiner

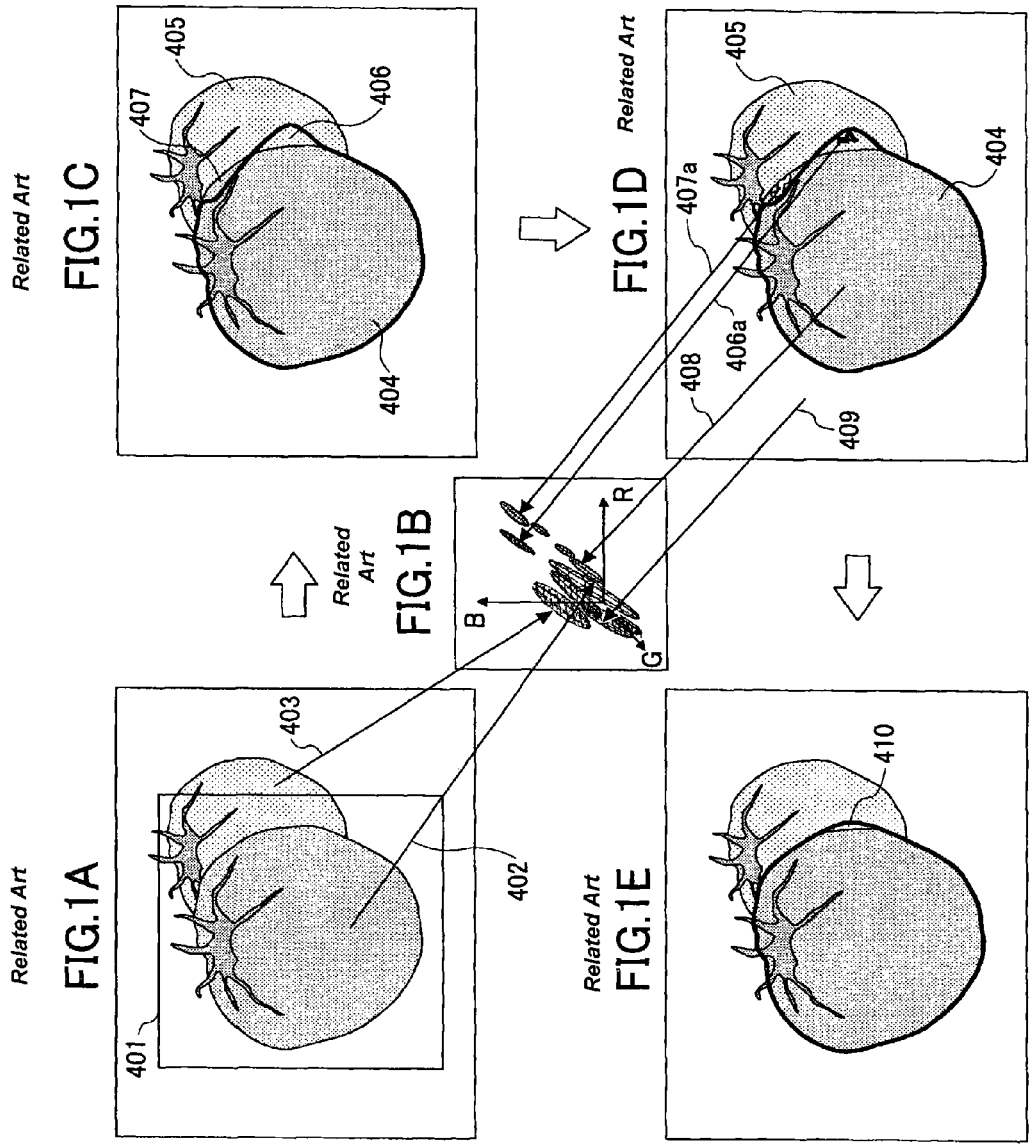

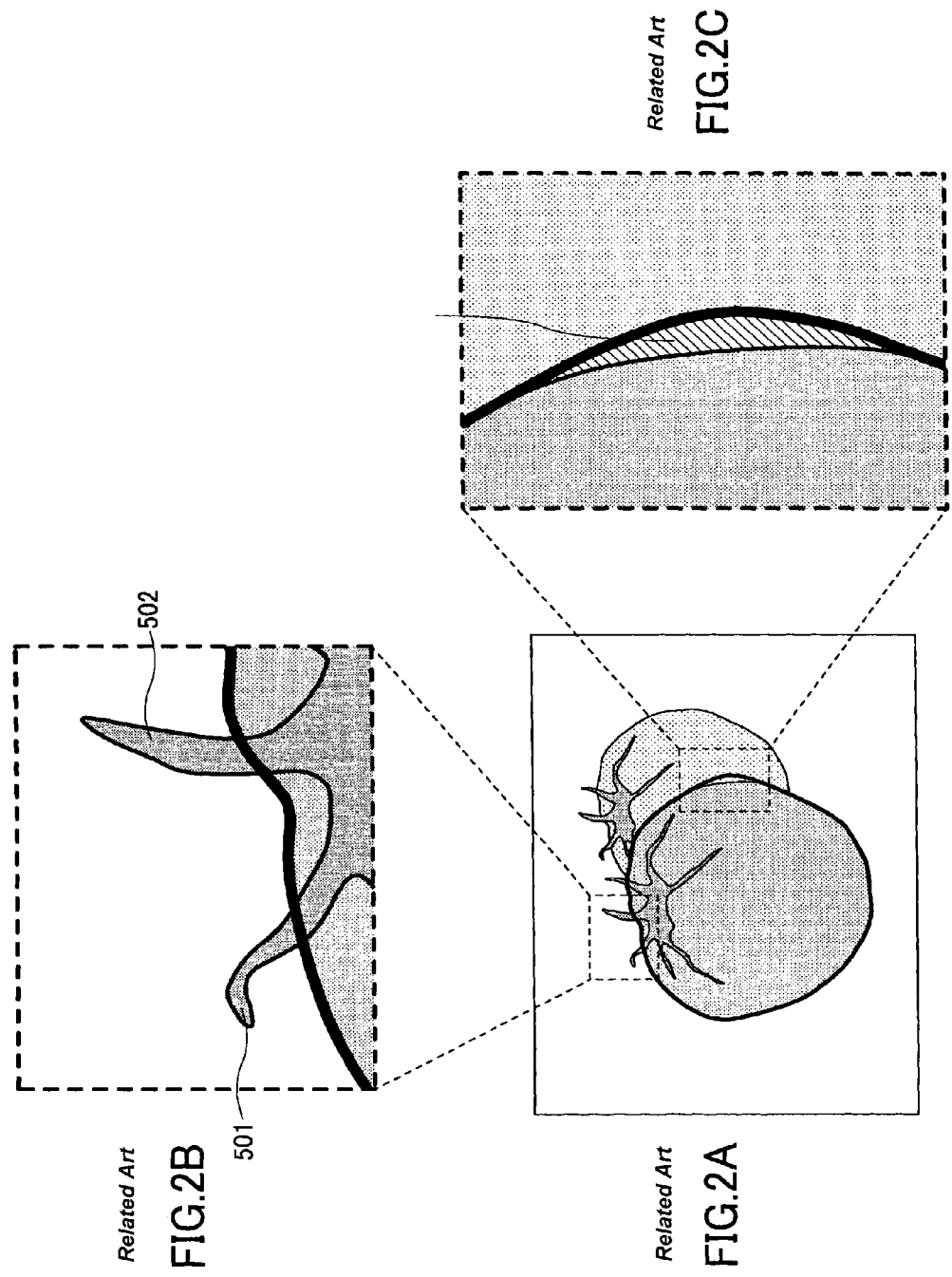

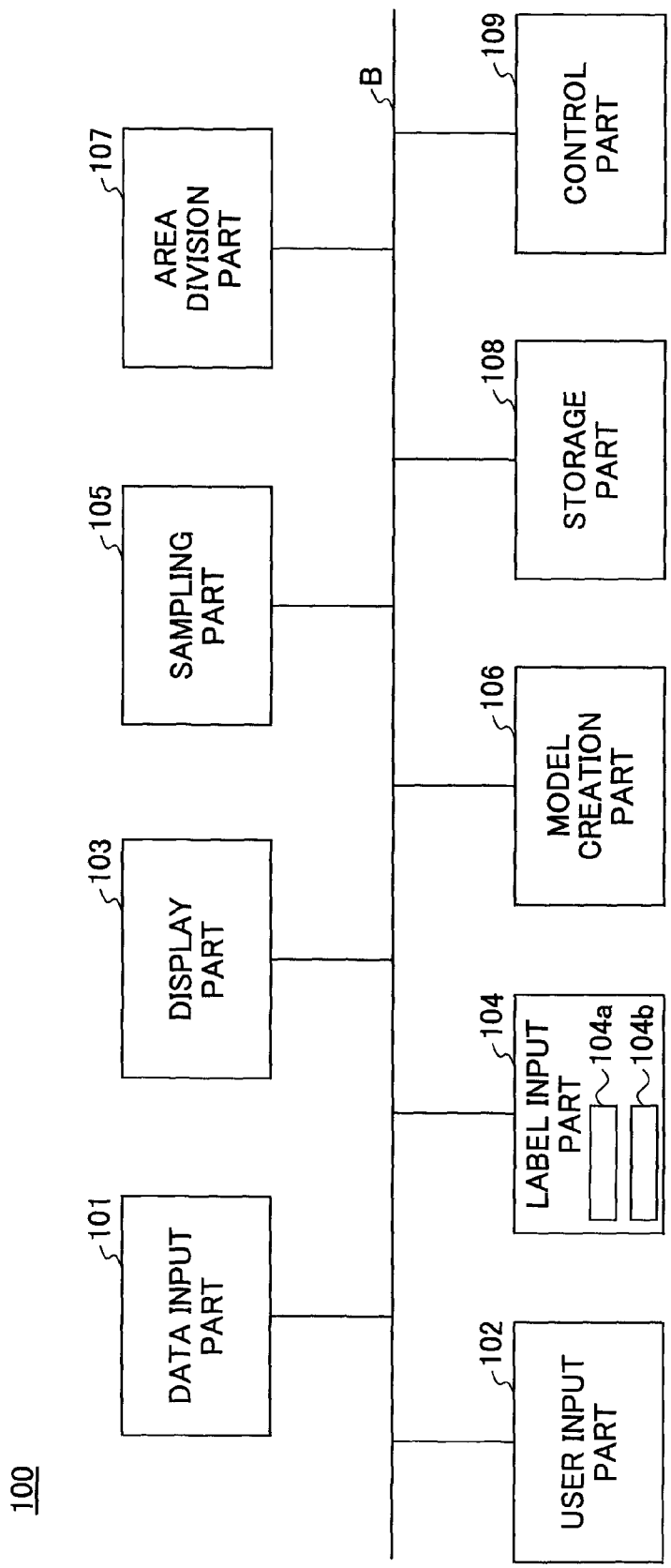

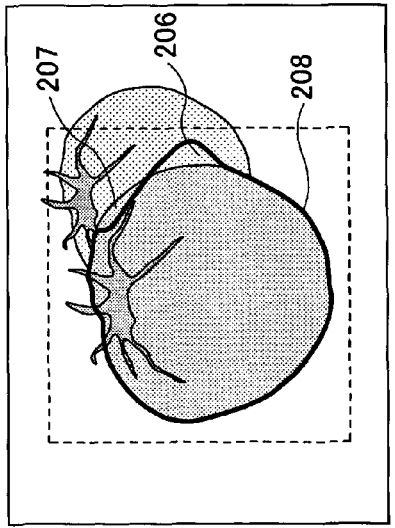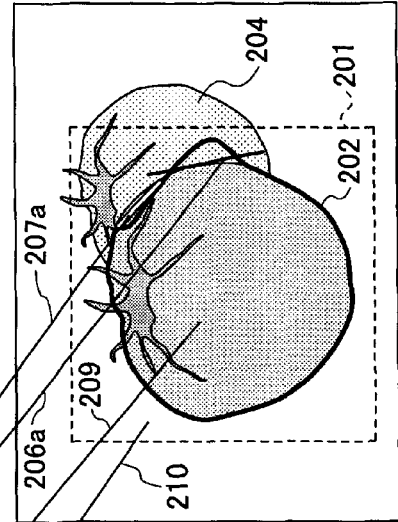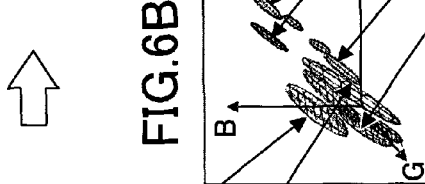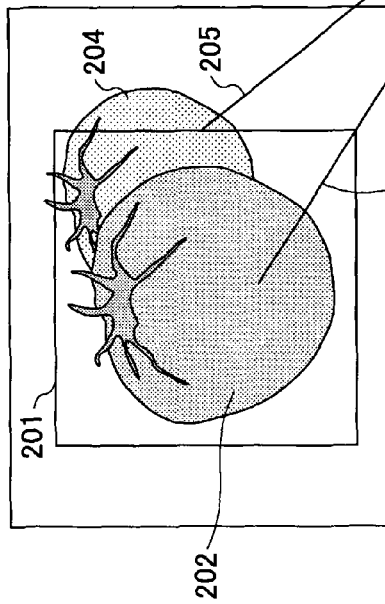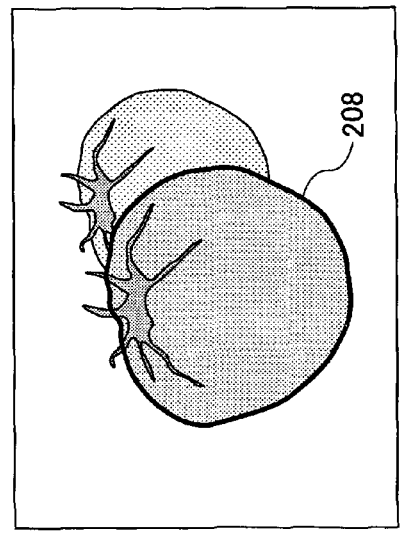

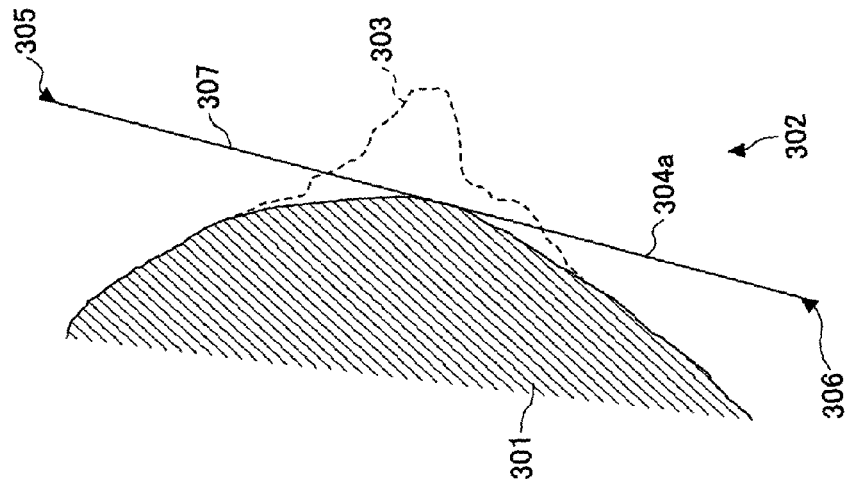
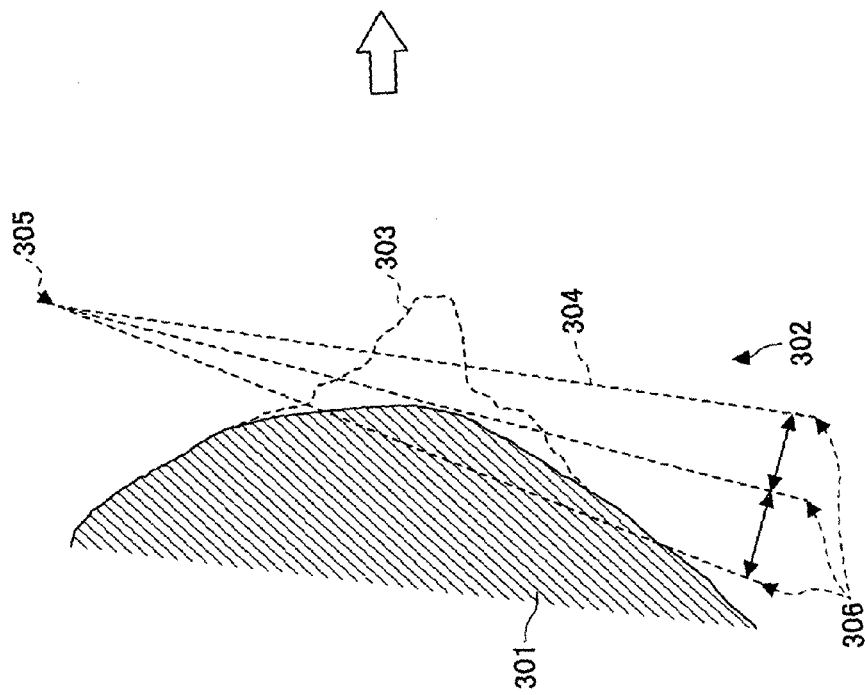

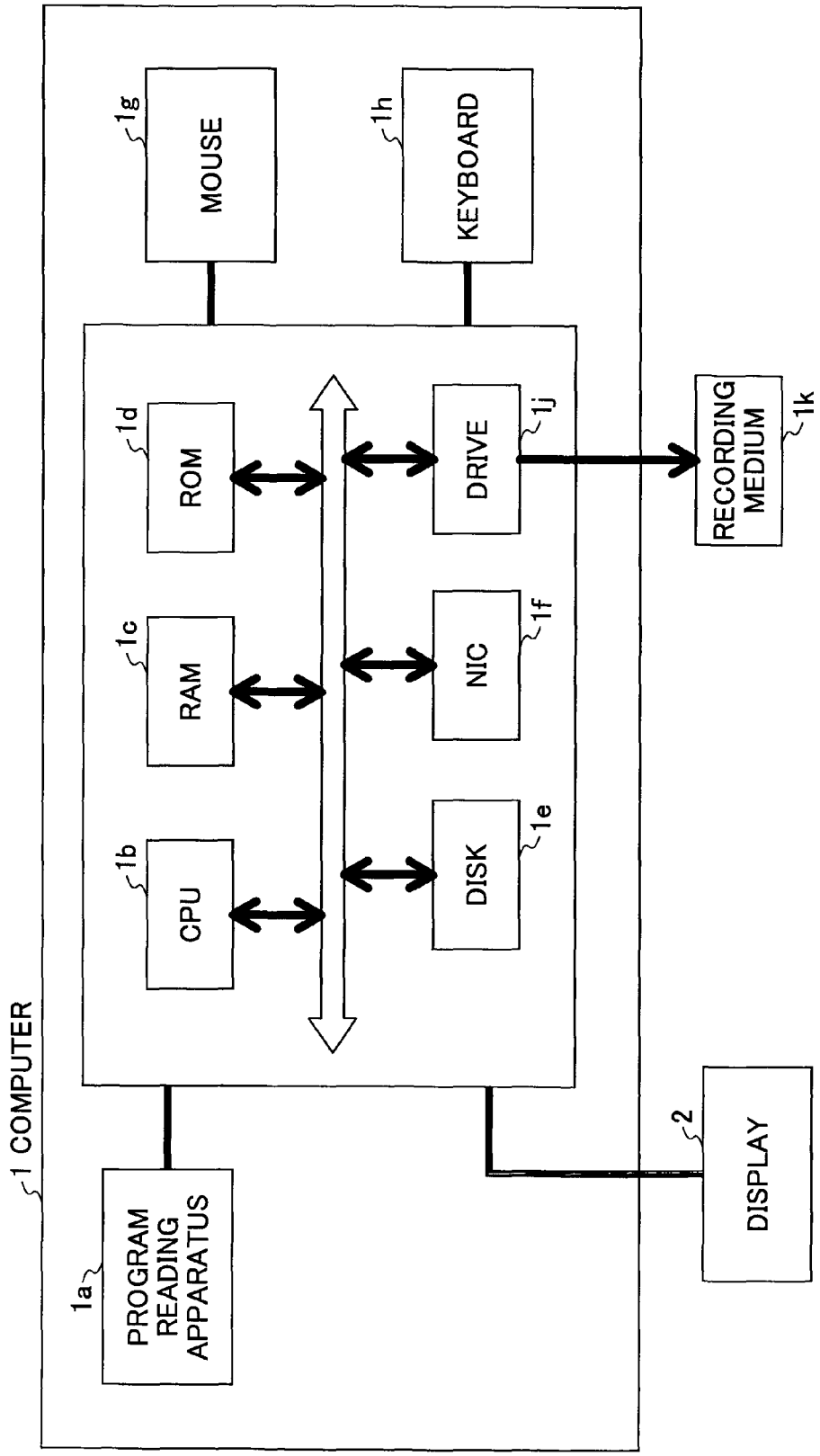

IMAGE PROCESSING APPARATUS, IMAGE PROCESSING METHOD, AND COMPUTER-READABLE RECORDING MEDIUM

TECHNICAL FIELD

The present invention relates to an image processing apparatus, an image processing method, and a computer-readable recording medium, for dividing an image.

BACKGROUND ART

There is a technology for automatically identifying a target (or an area) which a user desires to extract from image data. In this technology, in order to instruct a system what portion a user desires to extract as the target (or the area), a certain amount of labeling is manually conducted as initial values by the user, and then, the system automatically divides remaining portions by using the initial values. When the automatic dividing result includes an error, the system automatically re-divides the remaining portions, again (for example, see Patent Document 1 and Non-Patent Document 1).

FIG. 1A through FIG. 1E are diagrams for explaining a related art example. As illustrated in FIG. 1A, when the user encloses an extraction target by a frame 401, the system samples pixel value data 402 of a foreground from the entire inside area indicated by the frame 401, and creates a distribution model of the pixel value data 402 of the foreground in a Red, Green, and Blue (RGB) color space. Moreover, the system samples pixel value data 403 of a background from the entire outside area of the frame 401, and creates a distribution model of the pixel value data 403 of the background. The foreground or the background is determined based on whether an area is desired to be extracted, but is not determined based on a positional relationship.

After that, the foreground and the background are automatically divided by using distribution models of the foreground and the background which are created by the system. However, it is difficult to automatically and completely divide the foreground and the background in the above described technology. As illustrated in FIG. 1C, for example, an automatic division may easily cause an error for areas 406 and 407 where pixel values are close to each other, regarding a foreground area 404 of a front tomato and a background area 405 of a rear tomato. The area 406 is an area of the background erroneously divided as the foreground, and the area 407 is another an area of the foreground erroneously divided as the background.

As illustrated in FIG. 1D, the user modifies an area. A foreground marker 407*a* (which may be a white marker) is input to the area 407 erroneously divided as the background, and a background marker 406*a* (which may be a black marker) is input to the area 406 erroneously divided as the foreground. Since the automatic division is conducted again from the distribution models later, it is not required to completely modify a wrong area. By simply applying a modification marker to a portion of the wrong area, a marked area is expanded to modify the wrong area. The system samples the pixel value data from the foreground marker 407*a* and the foreground area 404 which is automatically divided. As illustrated in FIG. 1B, the system re-creates a distribution model 408 of pixels of the foreground in the RGB color space. Also, the system samples the pixel value data from the background marker 406*a* and the background area 405 which is automatically divided, and re-creates distribution models 409 of pixels of the background. Then, by using the distribution models 408 and 409 with respect to the foreground and the background which are re-created by the system and an algorithm for minimizing energy of a graph structure, as illustrated in FIG. 1E, the foreground and the background are automatically re-divided. In a case in which an error 410 still remains in a result from automatically re-dividing, a modification process from an operation depicted in FIG. 1D is repeated until there is a result in which the user satisfaction is acquired.

Patent Document 1: Japanese National Publication of International Patent Application No. 2009-545052

Non-Patent Document 1: C. Rother, V. Kolmogorv, A. Blake, "Interactive Foreground Extraction Using Iterated Graph Cuts", GrabCut, ACM Transactions on Graphics (SIGGRAPH'04), vol. 23, no. 3, pp. 309-314, 2004

Non-Patent Document 2: Vincent, Luc, and Pierre Soille, "Watersheds in Digital Spaces: An Efficient Algorithm Based on Immersion Simulations", IEEE Transactions of Pattern Analysis and Machine Intelligence, Vol. 13, No. 6, pp. 583-598, June 1991

DISCLOSURE OF THE INVENTION

Problems to be Solved by the Invention

However, as described above, after a user inputs a frame outside a foreground and a system conducts an automatic division, the user inputs other labels by using a brush, a marker, and the like for partial areas of the foreground and the background where wrong labels are applied and the system again conducts the automatic division. These processes are repeated. In the above described related art, there is a problem in which a number of control points to be inputted increases. Also, as illustrated in FIG. 2A through FIG. 2C, it is difficult to modify fine areas 501, 502, and 503 by the marker and the like. Thus, there is another problem in that it requires a number of steps to modify a border of areas automatically extracted. FIG. 2A is a diagram illustrating an example of the automatic division. FIG. 2B and FIG. 2C are diagrams illustrating magnification of error areas of the automatic division. Areas 501 and 502 are areas of the foreground erroneously divided as the background. An area 503 is an area of the background erroneously divided as the foreground.

Moreover, in a modification method in the related art, for example, as illustrated in FIG. 3A, since there is a large amount of control points to be input, when the user attempts to input the marker in an area close to a border line 10*e* of an extraction target, this modification indication 10*c* of the user easily intrudes into a foreground area due to hand jittering. The border line 10*e* is erroneously determined as a border between a foreground area 10*a* (corresponding to an extraction target) and a background area 10*b*. Pixels on the modification indication 10*c* are sampled. The user needs to modify an intruded portion 10*d* by an eraser tool and the like. Thus, excess operations are conducted by the user. Meanwhile, if the user carefully operates from the beginning not to intrude into the foreground area 10*a*, an operating speed becomes slow and the user easily becomes tired since his tension for this operation increases.

Also, for example, as illustrated in FIG. 2B, when the user attempts to input the fine areas 501 and 502 of stems of the tomato by the marker, the marker easily exits them. Hence, there is a problem in which the user needs to frequently change a width of the brush, a size of the marker, and the like, and this causes a lot of trouble for the user. It is possible to overcome the problem related to the width of the brush by a modification by a freehand line 10*f*. As illustrated in FIG. 3B, since a large amount of control points is input, the hand jittering occurs. It is difficult to indicate the modification by drawing a line by freehand without intruding into a fine portion of the foreground area 10a. In order to overcome these problems, a target portion may be modified on a magnified image and then be minimized. In this case, the user frequently needs to magnify and minimize the image. Another problem is raised in which operating steps of the user increase.

Means for Solving the Problems

It is a general object of at least one embodiment of the present invention to provide an image display apparatus that substantially obviates one or more problems caused by the limitations and disadvantages of the related art.

In one embodiment of the present invention, an image processing apparatus, including a modification part configured to instruct modification of a portion of a foreground area or a background area which is erroneously divided as a result of dividing predetermined image data into the foreground area being an extraction target and the background area being an out-of-extraction target; a model creation part configured to create a foreground model of the foreground area and a background model of the background area which are modified, based on first pixel values of a predetermined line segment where the modification is instructed and second pixel values of the foreground area and the background area which are divided; and a division part configured to divide the image data into the foreground area and the background area by using the foreground model and the background model which are created by the model creation part.

Effects of the Present Invention

According to an aspect of the present invention, it is possible to modify an error of an automatic division of a foreground and a background with fewer numbers of control points and of modification steps.

BRIEF DESCRIPTION OF THE DRAWINGS

FIG. 1A through FIG. 1E are diagrams for explaining a related art example.
FIG. 2A through FIG. 2C are diagrams for explaining an automatic division.
FIG. 4 is a diagram illustrating a configuration of an image processing apparatus in an embodiment of the present invention.
FIG. 6A through FIG. 6E are diagrams for explaining a modification process in the present invention.
FIG. 8A and FIG. 8B are diagrams for explaining a modification line segment input method in the present invention.
FIG. 11 is an example of a hardware configuration of the image processing apparatus in a case of carrying out the present invention by software.

DESCRIPTION OF THE REFERENCE NUMERALS

Figure 3B:
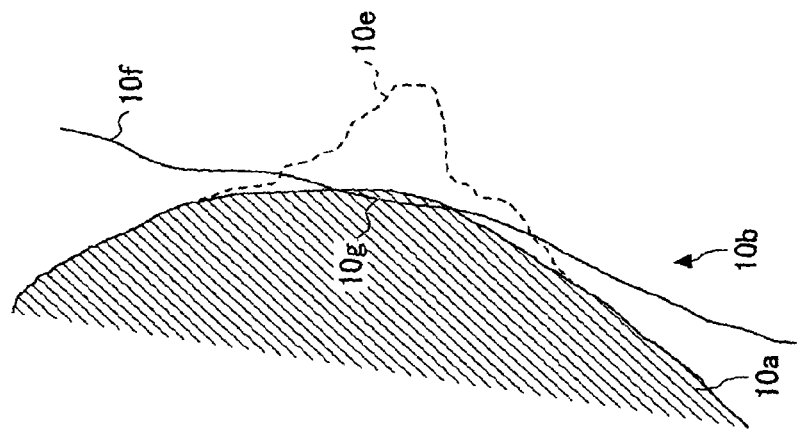
FIG. 3A through FIG. 3B are diagrams for explaining a modification method.
Figure 3A:
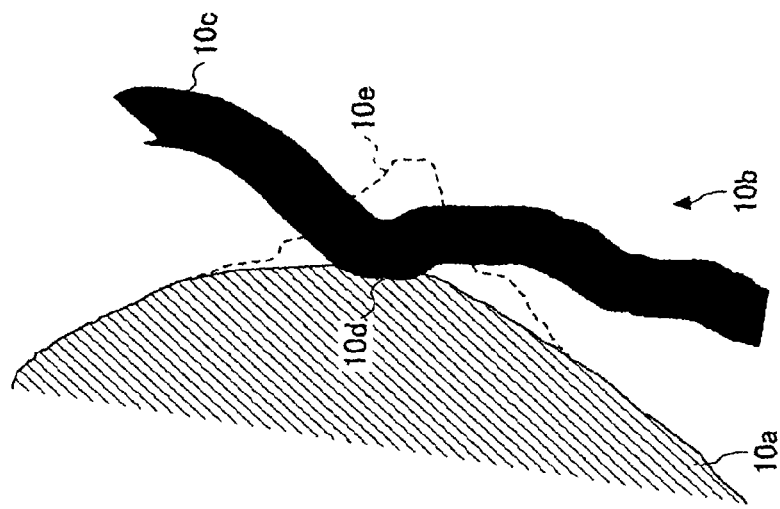

101 DATA INPUT PART
102 USER INPUT PART
103 DISPLAY PART
104 LABEL INPUT PART
105 SAMPLING PART
106 AREA DIVISION PART
107 STORAGE PART
109 CONTROL PART

MODE FOR CARRYING OUT THE INVENTION

In the following, embodiments of the present invention are described with reference to the accompanying drawings. In the present invention, in order to divide image data into a foreground and a background, portions of the foreground and the background are labeled and an automatic division is conducted. In order to modify an error of the automatic division of the foreground and the background, when another label is input for the portions of the foreground and the background which are erroneously labeled, a line segment is used to input another label. A tentative location of the line segment is displayed from when a start point of the line segment is indicated to when an end point of the line segment is decided. When the line segment is decided, a position of a final line segment is defined. Pixel values are sampled on the defined line segment. Sampled data are provided to an automatic area dividing process, and an extraction target is extracted from image data.

FIG. 4 is a diagram illustrating a configuration of an image processing apparatus 100 in an embodiment of the present invention. In FIG. 4, the image processing apparatus 100 includes a data input part 101, a user input part 102, a display part 103, a label input part 104, a sampling part 105, a model creation part 106, an area division part 107, a storage part 108, and a control part 109, which are mutually connected by a bus B.

The data input part 101 is used to read the image data from an outside, and for example, may be a file input apparatus or the like. The user input part 102 is used by a user to input data to the image processing apparatus 100, and for example, may be an input device such as a mouse, a touch pen, or the like. The display part 103 displays information (for example, the image data, a line segment indicated by a line segment indication function, a mask of a result, label data, and the like), and for example, may be a display of a Personal Computer (PC).

The label input part 104 is regarded as a input part for the user to input labels of a target to extract from an image and a background by line segments, and includes a line segment tentative location display part 104a and a line segment decision part 104b.

The sampling part 105 samples pixel values based on label information. The sampled pixel values are used by the area division part 107. It should be noted that a label input by the user can be used as a seed of an area division by the area division part 107.

The model creation part 106 models each of distributions of pixel values of the foreground and the background, respectively, based on pixel value data which are sampled by the sampling part 105. For example, the pixel values of the foreground and the background are modeled as a Gaussian mixture model in a Red, Green, and Blue (RGB) color space. In a case in which the area division part 107 uses an algorithm (for example, a Watershed algorithm) which does not require a modeling process, the model creation part 106 may be omitted.

The area division part 107 sets the image data and the label information input by the user as the seed, and automatically divides the extraction target and the background. For example, the area division part 107 executes an outline by using a graph cut algorithm or a Watershed algorithm. The graph cut algorithm defines an area division as an energy minimization problem, and conducts the area division by solving a maximum flow problem of a graph structure (see Non-Patent Document 1, and FIG. 10A through FIG. 10C).

Also, the Watershed algorithm is a technique of determining ridge points declining sequentially as an area boundary, when water is supplied in a geographical feature in a case in which the evaluation value of the image is made into altitude (see Non-Patent Document 2).

The storage part 108 retains data to realize the present invention. For example, the data may be image data, label data of an area, a start point of the line segment, an end point of the line segment, pixel values of the foreground, pixel values of the background, a model of the foreground, a model of the background, a graph structure, and the like. For example, the control part 109 controls the entire image process apparatus 100, and for example, corresponds to a Central Processing Unit (CPU).

Figure 5A:
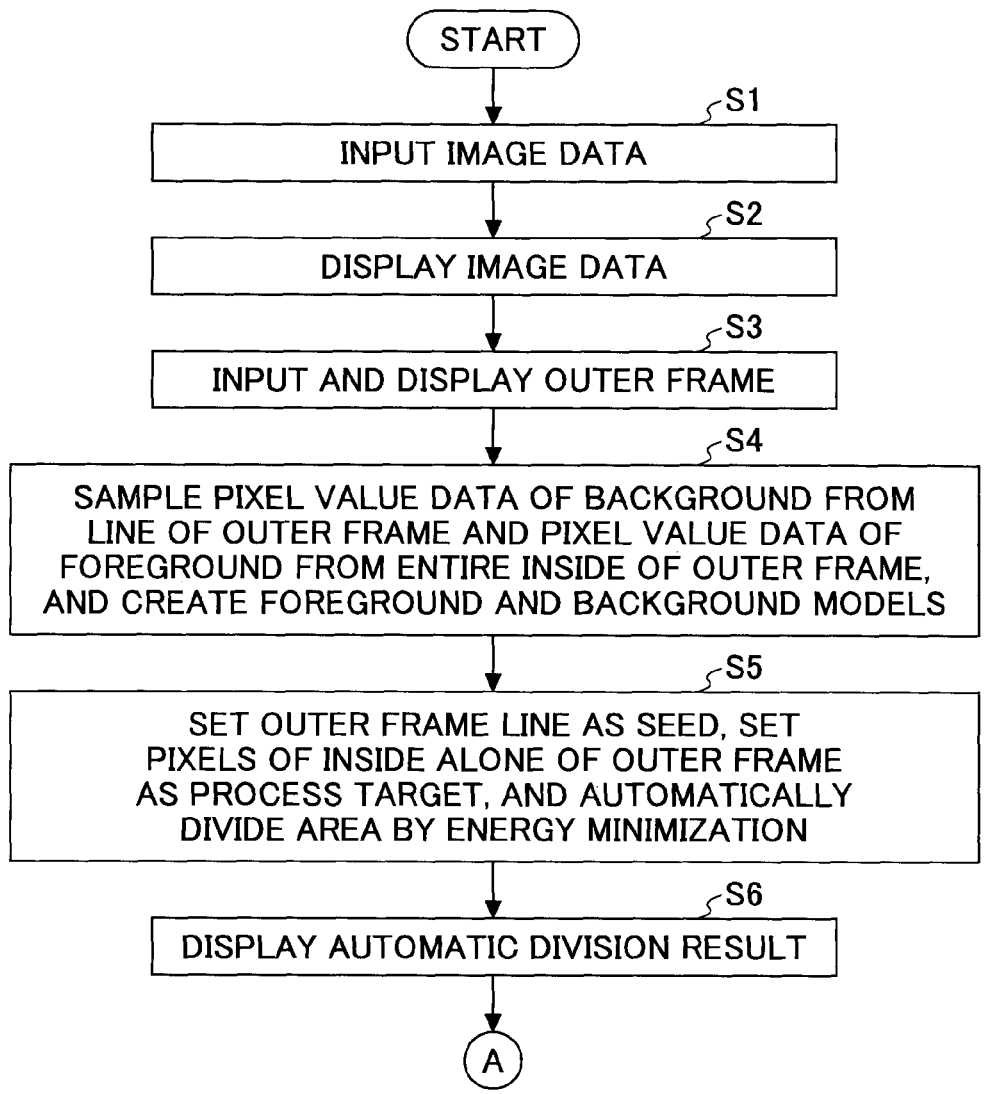
FIG. 5A and FIG. 5B are flowcharts for explaining a process in the embodiment of the present invention.
Figure 5B:
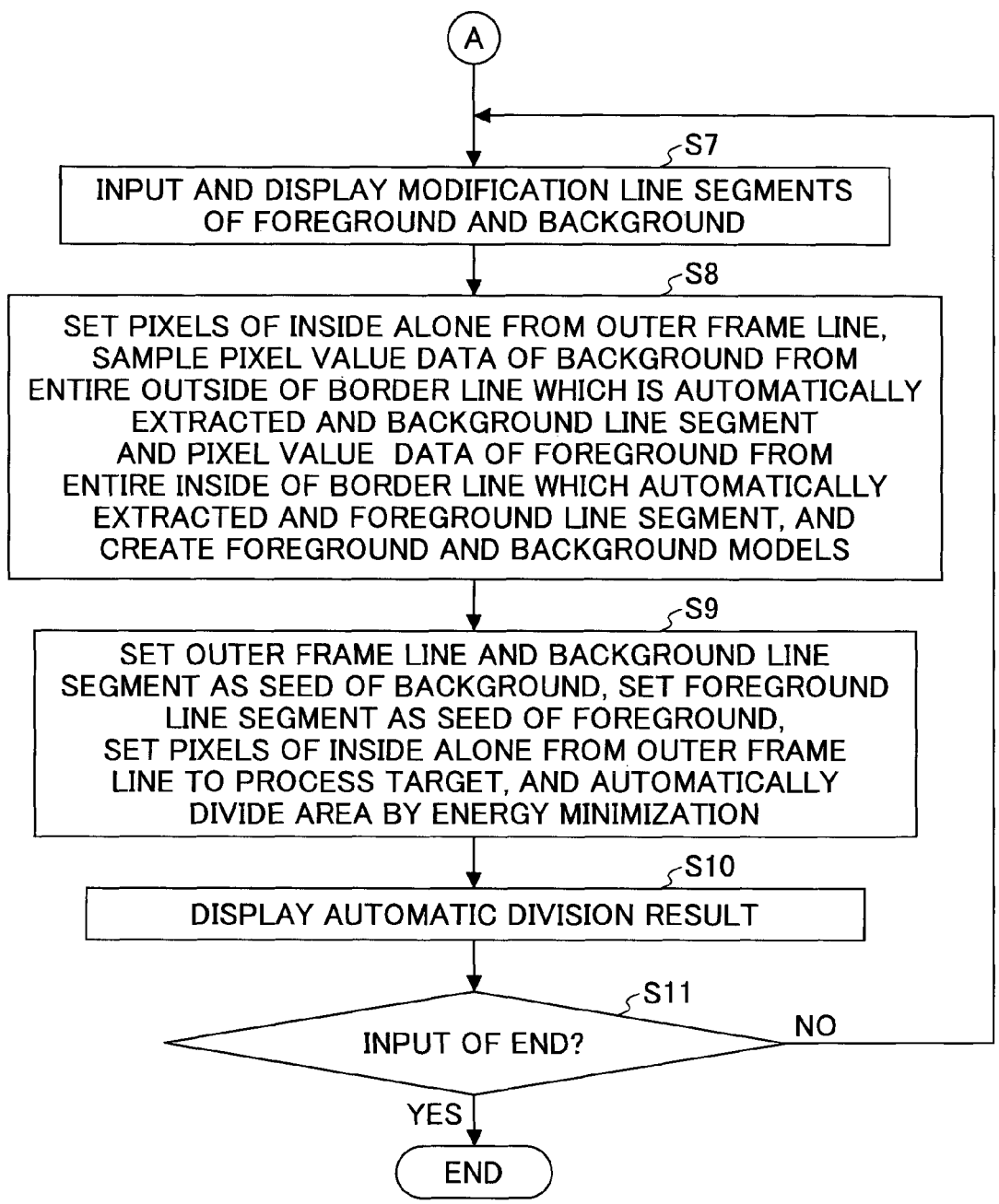

FIG. 5A and FIG. 5B are flowcharts illustrating a process in the embodiment of the present invention. In the following, the present invention will be described with reference to FIG. FIG. 5A and FIG. 5B. The data input part 101 reads out the image data from a file or the like and stores the image data in the storage part 108 (step S1). The display part 103 displays the image data read out from the file or the like at a display or the like (step S2). When the user inputs an outer frame by the user input part 102 to enclose a target which the user desires to extract, the display part 103 displays the outer frame input by the user (step S3).

The sampling part 105 samples the pixel value data of the background on the line segment of the outer frame and the pixel value data of the foreground from the entire inside of the outer frame, and the model creation part 106 creates a foreground model and a background model (step S4). Also, the sampled pixel value data and the created models are retained in the storage part 108. The same process is continued to store data in the following steps. The outer frame may be a process range input by a polygon, a free-form curve, or the like, in addition to a rectangle described above. Also, by processing pixels on a border line such as the rectangle, the polygon, the free-form curve, or the like as an input, it is possible to reduce a process amount of the image processing apparatus 100, and to reduce input steps of the user for a background portion.

The area division part 107 sets a outer frame line as a seed of the background, sets pixels of an inside alone from the outer frame line as a process target, and automatically divides an area by an energy minimization (step S5), and displays an automatic division result at the display part 103 step S6).

FIG. 6A through FIG. 6E are diagrams for explaining a modification process in the present invention. As illustrated in FIG. 6A, when the extraction target is enclosed by an indication frame line 201, the sampling part 105 samples pixel value data 203 of a foreground 202 from the entire inside of the indication frame line 201. As illustrated in FIG. 6B, the model creation part 106 creates a distribution model of pixels of the foreground 202 in the RGB color space. Also, the sampling part 105 samples pixel value data 205 of a background 204 on the indication frame line 201. As illustrated in FIG. 6b, the model creation part 106 creates the distribution model of pixels of the background 204.

As illustrated in FIG. 6C, the area division part 107 automatically divides an image in the indication frame line 201 into the foreground 202 and the background 204 by using the distribution models of the foreground 202, and both the background 204 and an algorithm of the energy minimization of the graph structure. A border line 208 corresponds to an outline of the foreground 202 divided from the image in the indication frame line 201. When the graph structure is created, the inside alone of the indication frame line 201 is set as a process target, so as to perform the above-described process at higher speed.

However, similar to the related art previously described, it is not possible to automatically and completely separate the foreground 202 from the background 204. For example, as illustrated in FIG. 6C, an error may easily occur at areas 206 and 207 of which pixel values are close.

Figure 7B:
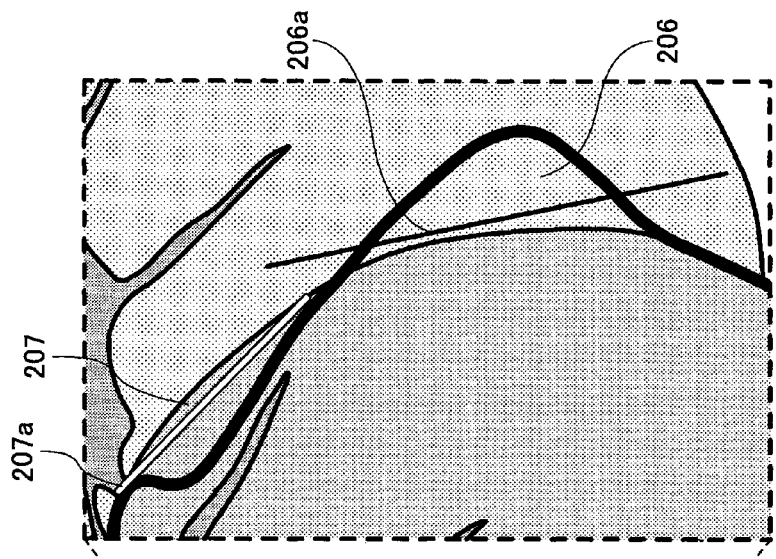
FIG. 7A through FIG. 7C are diagrams illustrating magnification of areas which are erroneously automatically divided.
Figure 7C:
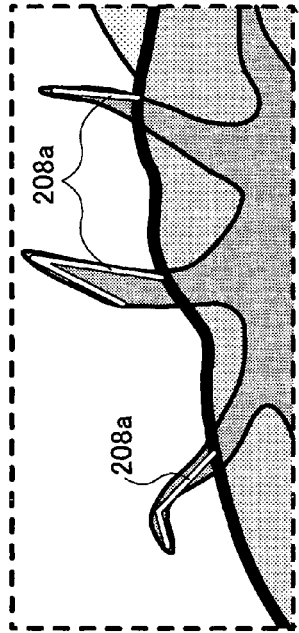
Figure 7A:
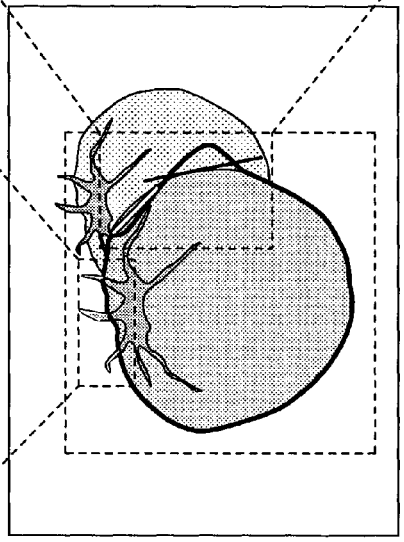

When the user inputs modified line segments of the foreground 202 and the background 204, the label input part 104 displays the modified line segments at the display part 103 (step S7). As illustrated in FIG. 6D (FIG. 7A) and illustrated by an enlarged view in FIG. 7A, to adjust erroneous areas, the user inputs a foreground modification line 207a in the area 207 which is erroneously determined as a portion of the background 204, and inputs a background modification line 206a in the area 206 which is erroneously determined as a portion of the foreground 202. In this case, the user is not required to completely modify errors since the automatic division is conducted again from the distribution models later. The user simply inputs a partial modification instruction, and the modification is expanded to correct the areas 206 and 207 which are erroneously determined. FIG. 7A corresponds to FIG. 6D. FIG. 7B and FIG. 7C illustrate magnification of the areas 206, 207, and the like which are erroneously automatically divided.

In FIG. 7B, the user inputs the background modification line 206a in the area 206 which is erroneously determined as the foreground 202, and inputs the foreground modification line 207a in the area 207 which is erroneously determined as the background 204. In FIG. 7C, the user similarly inputs foreground modification lines 208a in stem areas of a tomato which is erroneously determined as the background.

FIG. 8A and FIG. 8B are diagrams for explaining a modification line segment input method in the present invention. In an undetermined state of a modification line segment, for example, the user inputs a start point 305 of a line segment 304 by pressing a mouse button, and moves a mouse cursor to a tentative end point 306. The line segment tentative location display part 104a of the label input part 104 moves and displays the tentative line segment 304 in response to a movement of the mouse cursor. When the user releases the mouse button at the tentative end point 306 where the tentative line segment 304 is adjacent to the a foreground area 301, the line segment decision part 104b of the part label input part 104 determines the line segment 304. FIG. 8B illustrates a determined state of the modification line segment. An instruction 307 for modification is conducted by a determined line segment 304a.

In a case of displaying a tentative line segment at a tentative location, an image automatically enlarged in response to a length of the tentative line segment may be displayed. By this configuration, the user does not need to enlarge and minimize an area where the user operates. Also, when the tentative line segment is determined, the area division part 107 may be automatically operated. By this configuration, the user easily confirms an input result in real time. Furthermore, when the tentative line segment is displayed, the area division part 107 may be automatically operated. By this configuration, a real time performance can be improved. In addition, a modification operation of the user may be performed by combining an input of a surface by using the marker and the brush with an input of the free-hand line. By this combined operation, the user can easily indicate a wider area to modify.

The sampling part 105 samples the pixel value data of the foreground area 202 on the foreground modification line 207a, and samples pixel value data 209 of the foreground area 202 acquired by the automatic division. As illustrated in FIG. 6B, the model creation part 106 creates the distribution model of the pixels of an area of the foreground 202 in the RGB color space again. Also, the sampling part 105 samples the pixel value data of an area of the background 204 on the background modification line 206a, and samples the pixel value data 210 of the area of, the background 204 acquired by the automatic division. The inside alone of the indication frame line 201 is the process target. The model creation part 106 creates the distribution models of the pixels of the background 204 again (step S8).

The area division part 107 sets the outer frame line and the modification line segment of the background 204 as the seeds sets the modification line segment of the foreground 202, sets the pixels inside alone from the outer frame line as the process target, and automatically divides the area by the energy minimization (step S9). The area division part 107 automatically divides the area in the indication frame line 201 again to separate the foreground 202 and the background 204 by using the distribution models of the foreground and the background which are created again by the model creation part 106 and the algorithm of the energy minimization of the graph structure (FIG. 6E). The automatic division result is displayed at the display part 103 (step S10).

In a case of displaying the automatic division result, a border-line portion alone, which satisfies a display condition in the border line 208 being extracted, may be displayed. In detail, the border line portions having greater sizes until a certain rank from a top size may be displayed. Alternatively, a threshold is provided, and the border line portions having lengths greater than the threshold may be displayed. By this configuration, a border line portion such as a small spot is not to be displayed. Moreover, in a case of displaying the automatic division result, when there is a border line portion in an extracted border line, the border line portion which does not satisfy the display condition and a shape of the border line portion is an island or a hole explicitly indicated to be displayed, the border line portion may be displayed. In addition to preventing a display of the border line portion such as the small spot, it is possible to display the island and the hole which the user indicates to display. It should be noted that the island corresponds to the border line of the foreground which is disconnected from the border line portion which does not satisfy the display condition, and the hole corresponds to the border line of the background which is disconnected from the border line portion which does satisfy the display condition.

Moreover, in response to the instruction of the user, the foreground model and the background model used by the area division part 107 may be switched to be updated or not to be updated based on a previous result. By this configuration, it is possible to select based on a state to improve division accuracy by a model update or to prevent a change of a border of another area due to modification of an area.

Figure 9:
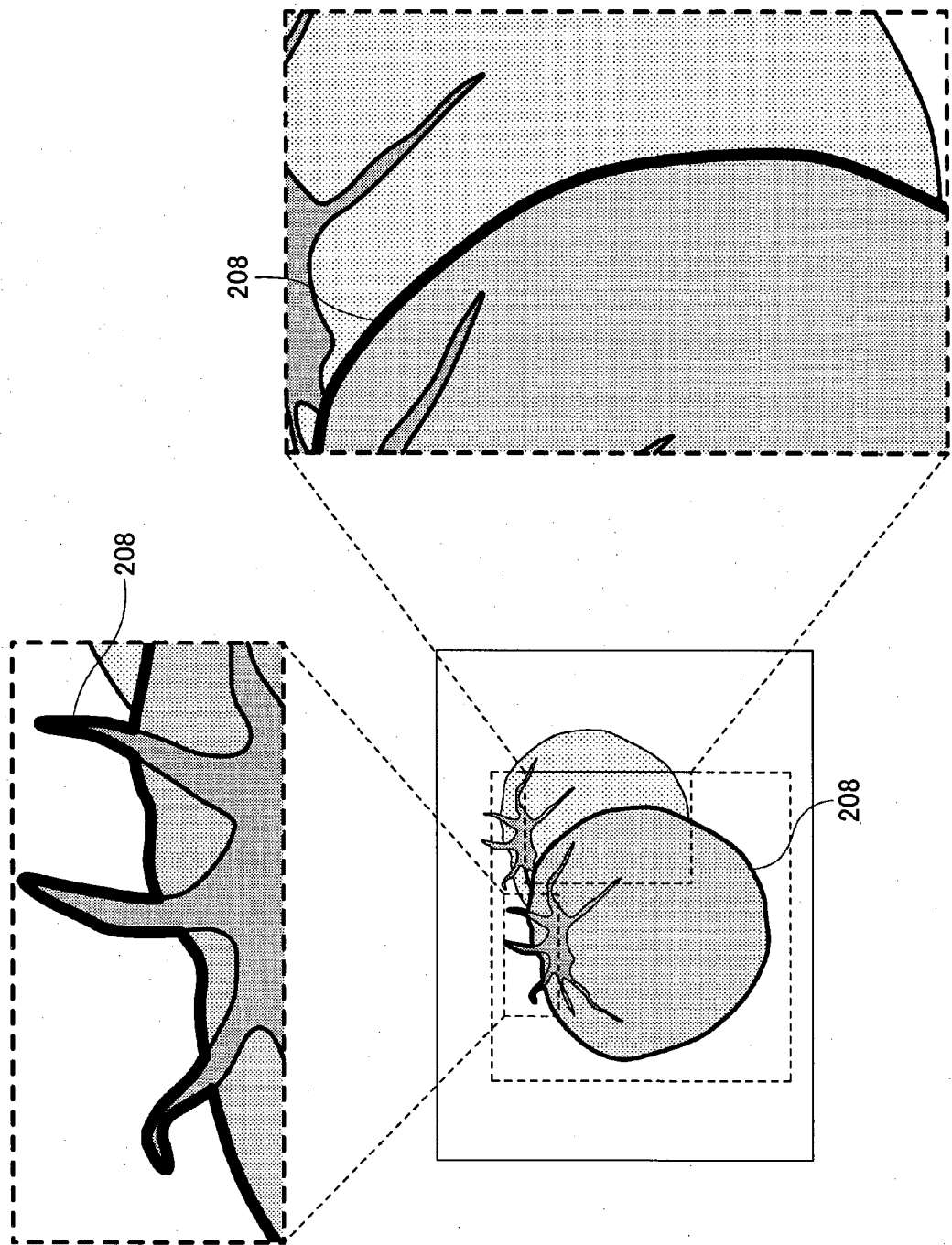
FIG. 9 is a diagram illustrating a division result in the present invention.

FIG. 9 is a diagram illustrating a division result in the present invention. Compared with the result of the related art (FIG. 1A through FIG. 1E), the automatic division result in the present invention is preferable, since a preferable result is acquired concerning the number of the control points and the number of the modification steps.

The user input part 102 determines whether the user inputs an end (step S11). When the user inputs the end, this process is terminated. When the user does not input the end, this process goes back to step S7 and the above described steps are repeated. If an error remains in the automatic division result, the modification operation can be repeated many times until the automatic division result is one in which user satisfaction is acquired.

In a case in which the modification operation is repeated several times, for example, a display of a previous line segment may be automatically deleted. By this configuration, it is possible to prevent the image from being displayed in a state in which input displays of the modification line segments are accumulated due to iteration.

Figure 10A:
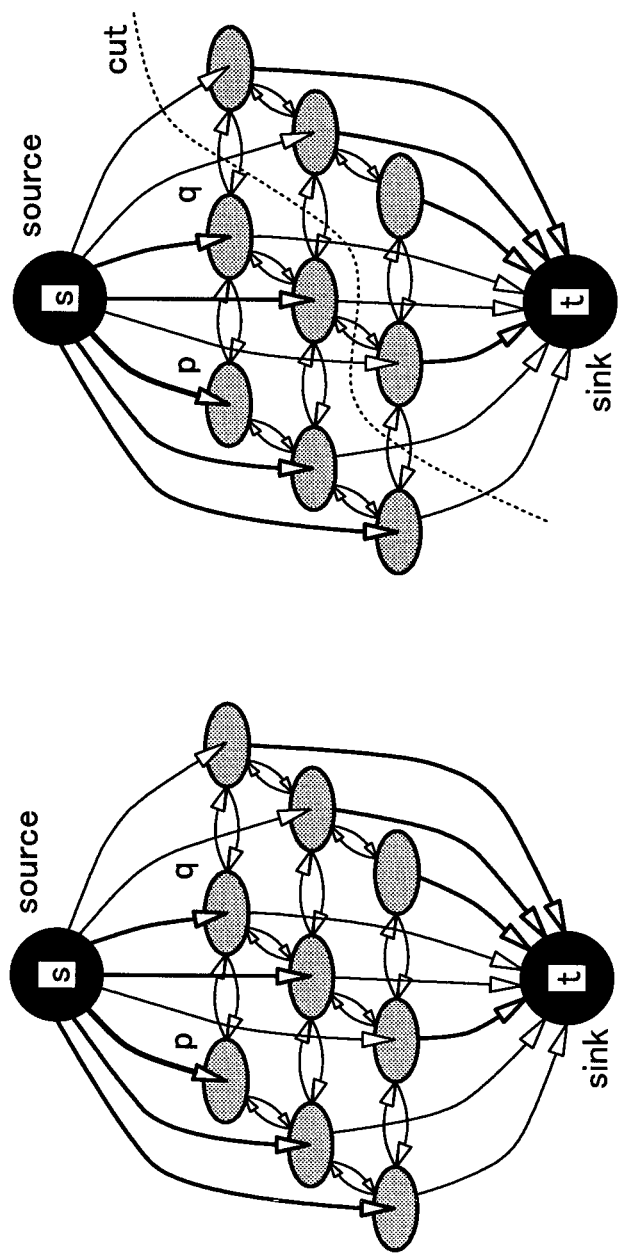
FIG. 10A through FIG. 10O are diagrams for briefly explaining a graph cut algorithm.
Figure 10B:
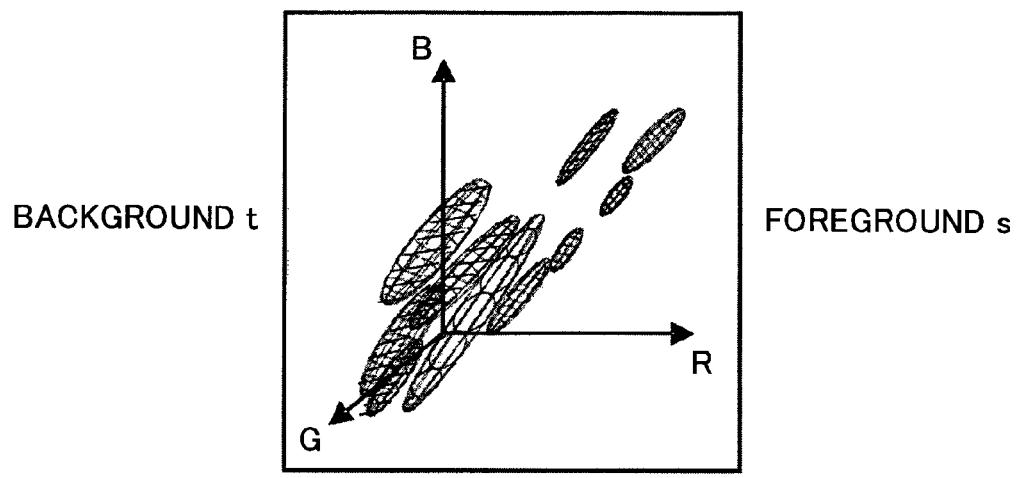
Figure 10C:
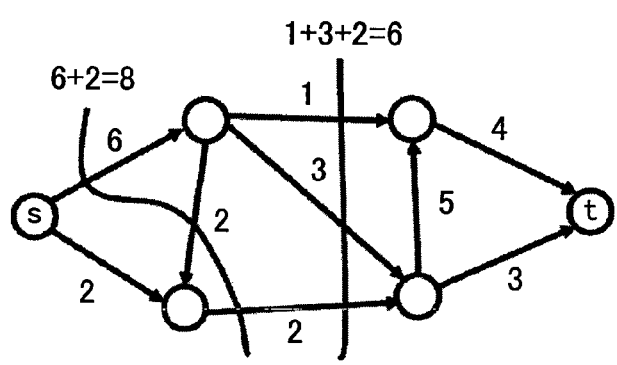

FIG. 10A through FIG. 10C are diagrams for briefly explaining the graph cut algorithm. The graph cut algorithm is a method for classifying nodes on a network into a predetermined number of groups. By using both an inter-node connection (t-link) and a connection with a super node (n-link), it is possible to consider both respective adjacent effects and similarity with a specific model. In FIG. 10A, each of the pixels corresponds to a node, and the foreground and the background correspond to super nodes.

In a case of applying to an area division in an image process, each of pixels in the image is set as a node, and is classified into two values corresponding to the foreground and the background. In addition to the adjacent effect, by separately maintaining the foreground model and the background model, respectively, it is possible to realize a highly accurate division.

The foreground model and the background model approximate distributions of the pixel values in a three-dimensional RGB color space by a Gaussian Mixture Model (GMM) (FIG. 10B). For example, a component number of the GMM is fixed to five. By this fixed component number of the GMM, it is possible to acquire capability of corresponding to the foreground having a dispersal background or a complex color distribution. In FIG. 10B, each of a foreground s and a background t is approximated by a Gaussian distribution of the specified number, so that a foreground likelihood and a background likelihood are defined. The foreground likelihood and the background likelihood are used as weights for connections to the super nodes.

$$\text{Energy Function } E = E_{color} + E_{coherence}$$

The energy function term ($E_{color}$) evaluates to which of the foreground and the background each of the pixels of an input image is closer. The energy function term ($E_{color}$) is defined and n-link is calculated. A term ($E_{coherence}$) is used to evaluate an adjacent relationship by t-link. The term ($E_{coherence}$) is embedded in the energy function.

The network is divided so that a total cut energy becomes minimum by using the energy function and the energy in a class becomes maximum (FIG. 10C).

FIG. 11 is an example of a hardware configuration of the image processing apparatus 100 in a case of carrying out the present invention by software. A computer 1 corresponds to the image processing apparatus 100 and includes a program reading apparatus 1a, a Central Processing Unit (CPU) 1b which, controls the entire image processing apparatus 100, a Random Access Memory (RAM) 1c used as a working area or the like of the CPU 1b, a Read-Only Memory (ROM) 1d in which a control program of the CPU 1b and the like are stored, a hard disk 1e, a Network Interface Card (NIC) 1f to communicate with a device in the network, a mouse 1g, a keyboard 1h, a display 2 which displays image data and with which information can be input by the user directly by touching a screen. The image processing apparatus 100 can be realized by a workstation, a personal computer, and the like, for example.

In a case of this configuration, it is possible to realize functions of the label input part 104, the sampling part 105, and the area division part 107 by the CPU 1b. In a case of storing the image data, label data of the area, the start point of the line segment, the end point of the line segment, the pixel values of the foreground, the pixel values of the background, the foreground model, the background model, data of the graph structure, and the like, a storage device such as the RAM 1c, the ROM 1d, the DISK 1e or the like may be used. Process functions performed by the CPU 1b can be provided by a software package, for example. Specifically, the process functions may be provided by a recording medium 1k (which may be an information recording medium), such as a Compact Disk Read Only Memory (CD-ROM), a magnetic disk, or the like. Thus, in the example illustrated in FIG. 11, a drive 1j as a medium drive device is provided to drive the recording medium 1k which records information, when the recording medium 1k is set in the drive 1j. The recording medium 1k may be formed of a non-transitory (or tangible) computer-readable recording medium.

As described above, an image processing method in the present invention can be also realized by a system configuration in which a program stored in the recording medium 1k such as the CD-ROM or the like is loaded into a general-purpose computer system including a display and the like, and a central processing unit of the general computer system is caused to execute an image process. In this case, the program to perform the image process in the present invention, that is, the program used by a hardware system is provided in a state in which the program is recorded in the recording medium 1k. The recording medium 1k where the program is recorded is not limited to the CD-ROM. For example, a ROM, a RAM, a flash memory, or a magnetic optical disk may be used. By installing the program recorded in the recording medium 1k into a storage device embedded in the hardware system, for example, the hard disk 1e, the program is executed and an image process function can be realized. Also, the program for realizing the image process method and the like in the present invention may be provided from a server by communication via the network, for example, as well as the recording medium 1k.

According to the present invention, it is possible to provide the image processing apparatus, the image processing method, the program, and the non-transitory computer-readable recording medium, in which an error of the automatic division of the foreground and the background can be modified by a fewer number of control points and a fewer number of modification steps.

Further, the present invention is not limited to these embodiments, and numerous variations and modifications may be made without departing from the scope of the present invention.

The present application is based on and claims the benefit of the priority dates of Japanese Patent Application No. 2012-062103 filed on Mar. 19, 2012, the entire contents of which are hereby incorporated by reference.

The invention claimed is:

1. An image processing apparatus for processing an image including a plurality of areas which include a foreground area and a background area, comprising:
 a modification part configured to instruct modification of a portion of the image which is erroneously divided as a result of dividing predetermined image data into the foreground area being an extraction target and the background area being an out-of-extraction target;
 a model creation part configured to create a foreground model of the foreground area and a background model of the background area which are modified, based on first pixel values of a predetermined line segment where the modification is instructed and second pixel values of the foreground area and the background area which are divided; and
 a division part configured to divide the image data into the foreground area and the background area by using the foreground model and the background model which are created by the model creation part.

2. The image processing apparatus as claimed in claim 1, wherein the modification part instructs the modification by determining a tentative line segment after displaying a tentative location of the tentative line segment connecting a start point of the predetermined line segment to a tentative end point.

3. The image processing apparatus as claimed in claim 1, wherein the division part displays a border portion alone which satisfies a predetermined display condition in a border of the foreground area.

4. The image processing apparatus as claimed in claim 3, wherein the division part displays an island and a hole which do not satisfy the predetermined display condition in the border of the foreground area.

5. The image processing apparatus as claimed in claim 2, wherein the modification part displays an image enlarged depending on a length of the tentative line segment when the tentative location of the tentative line segment is displayed.

6. The image processing apparatus as claimed in claim 1, wherein
 the foreground area of the extraction target forms a process range enclosed by a border line including a rectangle, a polygon, and a free-form curve, and
 the division part sets pixels on the border line as the background area, and conducts a process.

7. The image processing apparatus as claimed in claim 1, wherein the division part switches whether to update the foreground model and the background model, in response to an instruction of a user.

8. The image processing apparatus as claimed in claim 1, wherein the modification part deletes a display of the predetermined line segment to indicate a previous modification when instructing the modification.

9. The image processing apparatus as claimed in claim 2, wherein the division part is executed in response to a determination of the tentative line segment or a display of the tentative line segment.

10. An image processing method performed in a computer for processing an image including a plurality of areas which include a foreground area and a background area, the method comprising:
 instructing modification of a portion of the image which is erroneously divided as a result of dividing predetermined image data into the foreground area being an extraction target and the background area being an out-of-extraction target;
 creating a foreground model of the foreground area and a background model of the background area which are modified, based on first pixel values of a predetermined line segment where the modification is instructed and second pixel values of the foreground area and the background area which are divided; and
 dividing the image data into the foreground area and the background area by using the foreground model and the background model.

11. A non-transitory computer-readable recording medium storing a program which, when executed by a computer, causes the computer to perform a process for processing an image including a plurality of areas which include a foreground area and a background area, comprising:

instructing modification of a portion of the image which is erroneously divided as a result of dividing predetermined image data into the foreground area being an extraction target and the background area being an out-of-extraction target;

creating a foreground model of the foreground area and a background model of the background area which are modified, based on first pixel values of a predetermined line segment where the modification is instructed and second pixel values of the foreground area and the background area which are divided; and dividing the image data into the foreground area and the background area by using the foreground model and the background model.

* * * * *